(12) United States Patent
Beele

(10) Patent No.: US 11,703,154 B2
(45) Date of Patent: Jul. 18, 2023

(54) CONDUIT THROUGH WHICH AT LEAST ONE PIPE OR CABLE EXTENDS, AND METHOD FOR SEALING SUCH A CONDUIT

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 441 days.

(21) Appl. No.: 16/646,432

(22) PCT Filed: Sep. 11, 2018

(86) PCT No.: PCT/EP2018/074395
§ 371 (c)(1),
(2) Date: Mar. 11, 2020

(87) PCT Pub. No.: WO2019/048691
PCT Pub. Date: Mar. 14, 2019

(65) Prior Publication Data
US 2020/0271243 A1    Aug. 27, 2020

(30) Foreign Application Priority Data

Sep. 11, 2017   (NL) ........................................ 1042540

(51) Int. Cl.
*F16L 5/04* (2006.01)
*A62C 2/06* (2006.01)
(Continued)

(52) U.S. Cl.
CPC ................................... *F16L 5/04* (2013.01);
*A62C 2/06* (2013.01); *A62C 3/16* (2013.01);
*H02G 3/0412* (2013.01); *H02G 3/22* (2013.01)

(58) Field of Classification Search
CPC ...... F16L 5/04; A62C 2/06; A62C 3/16; A62C 2/065; H02G 3/0412; H02G 3/22; H02G 3/04; E04B 1/941
See application file for complete search history.

(56) References Cited

U.S. PATENT DOCUMENTS

| 4,109,423 A | * | 8/1978 | Perrain | ..................... F16L 5/04 251/7 |
| 4,538,389 A | * | 9/1985 | Heinen | ..................... F16L 5/04 52/220.8 |

(Continued)

FOREIGN PATENT DOCUMENTS

| CN | 201129552 Y | 10/2008 |
| CN | 201680069 U | 12/2010 |

(Continued)

OTHER PUBLICATIONS

International Search Report and Written Opinion dated Oct. 12, 2018 in connection with International Application No. PCT/EP2018/074395.

(Continued)

*Primary Examiner* — Babajide A Demuren
(74) *Attorney, Agent, or Firm* — Wolf, Greenfield & Sacks, P.C.

(57) ABSTRACT

Conduit through which at least one pipe or cable extends, wherein the conduit has an inner wall and is provided with a system for sealing in the conduit that is unoccupied by the at least one pipe or cable, wherein the system comprises: at least one rubber element for providing in the conduit a support-structure which is clamped-in between the inner wall and the at least one pipe or cable; and a sealant layer against the support-structure and for sealing off at least one end of the conduit between the inner wall and the at least one pipe or cable, wherein each rubber element is made of a fire-resistant vulcanized rubber of a thermally substantially non-expandable type, and wherein the sealant is made of a fire-resistant polymer which is vulcanizable at room temperature under exposure to humidity and which is also of the thermally substantially non-expandable type.

24 Claims, 6 Drawing Sheets

(51) Int. Cl.
*A62C 3/16* (2006.01)
*H02G 3/04* (2006.01)
*H02G 3/22* (2006.01)

(56) References Cited

U.S. PATENT DOCUMENTS

| | | | | |
|---|---|---|---|---|
| 5,105,592 | A * | 4/1992 | MacMillan | F16L 5/04 52/232 |
| 5,351,448 | A * | 10/1994 | Gohlke | H02G 3/22 52/220.8 |
| 5,452,551 | A * | 9/1995 | Charland | A62C 2/065 52/220.8 |
| 6,360,502 | B1 * | 3/2002 | Stahl, Jr. | A62C 2/065 52/220.8 |
| 7,712,791 | B1 * | 5/2010 | Whitehead | F16L 5/02 52/220.8 |
| 9,046,194 | B2 * | 6/2015 | Gandolfo | H02G 3/22 |
| 9,220,932 | B2 * | 12/2015 | Zernach | A62C 2/065 |
| 2010/0164176 | A1 * | 7/2010 | Beele | F16L 5/04 277/606 |
| 2010/0294519 | A1 * | 11/2010 | Beele | F16L 5/04 169/45 |

FOREIGN PATENT DOCUMENTS

| | | | |
|---|---|---|---|
| CN | 105 135 065 A | 12/2015 | |
| CN | 105 805 426 A | 7/2016 | |
| CN | 112448339 A * | 3/2021 | H02G 3/0406 |
| EP | 2 116 280 A2 | 11/2009 | |
| EP | 2 126 438 B1 | 7/2010 | |
| JP | 2004-232452 A | 8/2004 | |
| JP | 2010-519490 A | 6/2010 | |
| JP | 2010-530945 A | 9/2010 | |
| JP | 2016-223279 A | 12/2016 | |
| KR | 10-1217703 B1 | 1/2013 | |
| WO | WO 03/067136 A1 | 8/2003 | |
| WO | WO 2006/097290 A1 | 9/2006 | |
| WO | WO 2008/104237 A1 | 9/2008 | |
| WO | WO 2009/000778 A1 | 12/2008 | |
| WO | WO-2013160776 A1 * | 10/2013 | A62C 2/065 |
| WO | WO 2016/009092 A2 | 1/2016 | |
| WO | WO-2018207008 A1 * | 11/2018 | |
| WO | WO 2019/048691 A1 | 3/2019 | |
| WO | WO-2021020614 A1 * | 2/2021 | F16L 5/04 |

OTHER PUBLICATIONS

International Preliminary Report on Patentability dated Sep. 23, 2019 in connection with International Application No. PCT/EP2018/074395.
PCT/EP2018/074395, Oct. 12, 2018, International Search Report and Written Opinion.
PCT/EP2018/074395, Sep. 23, 2019, International Preliminary Report on Patentability.

* cited by examiner

CONDUIT THROUGH WHICH AT LEAST ONE PIPE OR CABLE EXTENDS, AND METHOD FOR SEALING SUCH A CONDUIT

CROSS-REFERENCE TO RELATED APPLICATIONS

This application is a national stage filing under 35 U.S.C. § 371 of international application PCT/EP2018/074395, filed Sep. 11, 2018, which claims priority to Netherlands application 1042540, filed Sep. 11, 2017, each of which is herein incorporated by reference in its entirety.

INTRODUCTION

The disclosure is related to a conduit through which at least one pipe or cable extends, and to a method for sealing such a conduit.

THE BACKGROUND OF THE INVENTION

A sealing system is usually applied in a conduit which is itself in one way or another incorporated in a construction element that, for instance, divides two compartments. A pipe or cable may extend through the conduit from one of the two compartments into the other. Such a conduit is often present on board of vessels and/or other offshore applications such as oil rigs. These conduits are often referred to as pipe or cable penetrations or transit systems. These penetrations are seen as unwelcome necessities in such a construction. Pipes for, for instance, water distribution and water wastage systems, air conditioning systems, hydraulic and pneumatic control, sprinkler etc. but also for transport of gas, or oil, need to be extending throughout such a construction, even though this entails introducing "weak spots" in a separation of the compartments. Instead of pipes also cables could extend through a conduit. Such cables could for instance be electricity cables. Thus, where reference in this disclosure is made to a pipe, this could equally be a reference to a cable.

Such weak spots do not manifest themselves to a great extent in the mechanical strength of the construction but much more in the undesired transport of physical phenomena throughout the structure. One of these physical phenomena is the occasion of a fire which needs to be confined for as long as possible to only one area, not only to allow for control and extinguishing the fire, but also to provide time for people present in compartments near to the fire for reaching a safe distance from the fire before it further spreads. To prevent smoke and/or fire from passing through the conduit from one compartment to another, the conduit is usually provided with material that closes the conduit, at least for some time, when the conduit is exposed to heat due to a fire.

Although above reference is made to a construction element having a conduit and dividing two compartments, it is also possible that the construction element separates a compartment from the surrounding environment. It is thus possible that one side of the construction element is exposed to atmospheric conditions.

It will be appreciated that a pipe extending through a conduit, the conduit itself and the construction element into which the conduit is incorporated, are each usually made of a heat conducting material, for instance aluminium or steel. It is often the case that in these circumstances, heat still only enters the conduit sleeve via the pipe or pipes which extend from the side exposed to fire into the conduit. The same applies to cables which often have a metal core. The entrance of heat through material of which the conduit is made, is often inhibited by a thermally insulating lining provided against the outer wall of the conduit and the construction element in which the conduit is incorporated.

However, nowadays, thermally insulating lining is not always applied around the conduit and consequently heat can be conducted through the conduit material from an outside to an inside side of the conduit. It follows that heat can be supplied via at least two routes to the inner space of the conduit. The first route is the supply via the pipes or cables extending into the conduit and a second route is the supply of heat to the inner space of the conduit by the thermally conductive material out of which the conduit is made. As heat may be supplied via two routes, heat may be supplied very rapidly to the inner space of the conduit sleeve. These conditions are frequently found in offshore constructions and vessels, where construction materials are indeed made of metal, i.e. a heat conducting material. In constructions other than offshore constructions and vessels, like for instance onshore constructions, entrance of heat via the second route takes place much less often, if occurring at all.

WO 2006/097290 describes a system which is to a certain extent suitable for placement in a conduit as described as above. That system comprises heat expandable rubber sleeves. The rubber is made heat expandable by incorporation of heat-expandable graphite into that rubber. The system further comprises a fire resistant and/or watertight sealant for sealing off both ends of the conduit. When exposed to a nearby fire, the heat transferred into the conduit causes the expandable sleeves to expand and as such to seal off the conduit by forming a soft, almost powder-like mass without offering mechanical stability to the sealing. The expansion may cause the sealant layer to break. This breaking is in itself not a problem as the expanded sleeves have sealed off the conduit before the sealant layer breaks. Sometimes, also the sealant is made heat-expandable.

To allow for rapid and uninhibited thermal expansion, the components of the rubber sleeves are kept together within the dimensions of the sleeve but are certainly not captured in a rigid internal structure. Consequently, the sleeves are rather soft. As one never knows how much heat input is provided to the sealing system, and to ensure that it responds timely and sufficiently the system is such that even when only a relatively small increase in temperature is experienced a portion of the system expands, and closure of the conduit takes place. In other words, due to the uncertainty in the amount of heat reaching the sealing system, the system is made very sensitive. An "excess" of heat results consequently in an over-responding expansion, even outwards the conduit.

Although such systems are satisfactorily used and pass many fire safety tests, an alternative and perhaps an even further improved system, remains desirable, as safety on board of offshore constructions and/or vessels is in practice always a compromise between costs and time during which a penetration has to withstand a fire at one side of the penetration.

WO 2008/104237 A1 describes a system for sealing in a conduit space that is unoccupied in the at least one pipe or cable extending through the conduit. The system comprises at least one rubber element for providing in the conduit a support-structure which is clampable between the inner wall and the at least one pipe or cable; and a sealant for application against the support-structure and for sealing off at least one end of the conduit between the inner wall and the at least one pipe or cable. Each rubber element is made of a fire resistant vulcanized rubber of a thermally substantially non-expandable type. The sealant is made of a fire resistant polymer which is vulcanizable at room temperature under exposure to humidity and which is also of the thermally substantially non-expandable type.

One or more rubber elements of vulcanized rubber have, when clamped in the conduit, a high mechanical stability. Due to this, the sealant forms, when applied against the structure, not only a barrier against smells and smoke, but also against water.

It has turned out, that before exposure to a nearby fire, the sealant, as supported by the support-structure, can easily withstand a pressure of 7 bar without causing bulging of the sealant into the conduit at the exposed side. It has further turned out that the sealing is thermally insulating. It further became clear that in use and under exposure to a nearby fire, such a system experiences such little thermal expansion that the support-structure as provided by the one or more rubber elements clamped in the conduit, the rubber seal as provided by the sealant, remains in place and continues to provide a suitable sealing. After exposure to a nearby fire, a great deal of the sealing remains unconsumed, and to a certain extent still acts as a sealing.

A major advantage of the system disclosed in WO 20008/104237 A1 is that the sufficiency of the sealing can easily be assessed "on the spot" by any worker installing the system. Designing prior to installing, in an office using a computer on the basis of thermal management considerations and/or thermal expansion considerations, i.e. factors which determine the performance of a sealing system under a modelled fire, is not necessary. Once the stability of the sealing system has been established prior to exposure to a nearby fire, i.e. during installation of the sealing, the stability during exposure to a nearby fire changes little. In other words, the mechanical stability and thermal insulation is largely maintained during exposure to a nearby fire. The sealing system remains in place and remains functioning as a sealing system. No parts of the sealing system fall out of the conduit.

The system disclosed in WO 2008/104237 A1 is also applicable in situations wherein no thermal insulation is applied to the conduit or to the construction element in which the conduit is incorporated. It turns out that the sealing system can withstand very high temperatures.

However, the system as known and applied requires a relatively long time of installing and requires large conduits of usually 18 cm length as a minimum.

According to a first aspect of the present disclosure it is an object to provide a conduit that is the result of a faster installation and that is smaller than presently used.

According to this first aspect of the present disclosure a conduit is provided through which at least one pipe or cable extends. The conduit has an inner wall and is provided with a system for sealing in the conduit space that is unoccupied by the at least one pipe or cable. The system comprises at least one rubber element for providing in the conduit a support-structure which is clamped-in in the space that is unoccupied by the at least one pipe or cable; and a sealant layer against the support-structure for sealing off at least one end of the conduit between the inner wall and the at least one pipe or cable. Each rubber element is made of a fire-resistant vulcanized rubber and is of a thermally substantially non-expandable type. The sealant is made of a fire-resistant polymer and is also of the thermally substantially non-expandable type. The sealant is vulcanizable under exposure to humidity or has vulcanized. The sealant layer has a thickness in a range of 14-16 mm, and preferably has a thickness of 15 mm, wherein each rubber element is a longitudinal element, and wherein each longitudinal element has a length in a range of 12 to 14 cm, and preferably has a length of 13 cm. Advantageously, the vulcanization of the fire-resistant polymer took place much faster as a result of a reduced thickness of the layer, as compared to thicknesses of layers known, approved, and applied in the art, of usually 20 mm, or more. Surprisingly, not only did the sealing layer more rapidly cure after application, it also became a better sealant. Hence, against expectations, the reduced thickness provides a better sealant layer as compared to a thicker sealant layer. Although the effect is noticeable at any thickness in a range of 14-16 mm, the development that has led to the present disclosure has indicated that an optimal thickness of sealant layer is 15 mm.

Consequently, this means that a conduit does not need to be as long so as to accommodate for a sealant layer of 20 mm at each end. Every reduction in the thickness of the sealant layer, can lead to double that reduction in the length of the conduit, given that a sealant layer is applied at each end of the conduit.

As the sealant layers are better as sealants, also the support-structure can have a smaller dimension in the axial direction of the conduit. First of all, the sealant layer and its support-structure adhere much better to each other and have therefore a stronger connection, overall enhancing the stability of the sealing system in the conduit. Secondly, as will be explained in more detail below, as the adherence of the sealant to the support-structure is better, air trapped in the support-structure, has very little interaction with the environment, if any at all, and is therefore a much better thermal insulator as compared to an air pocket present in similar conduits in the prior art.

As a consequence of the possibility of a shorter support-structure (short in the length-direction of the conduit) and thinner sealant layers, it is also possible to reduce the length dimension of the conduit. That is, in axial direction the conduit can be shorter, and thus to a much lesser extent occupy space in compartments that are divided by a construction element in which the conduit has been incorporated.

Tests have shown that an exposure to a nearby fire the sealant layer protects the support-structure. Although the sealant layer may have changed in a charred layer, little charring if any at all was noticeable on the support-structure.

Without wishing to be bound by any theory, contrary to conventional wisdom that "the thicker the sealant layer, the better the sealing integrity", it has now been found that a thinner sealant layer actually provides a better result. It is believed to be a result of a shorter time needed for the vulcanization, given the thinner layer. Further, with a better sealant layer, it is possible also to have a shorter support-structure. It was always believed that a longer support-structure would be clamped-in more strongly. However, it has turned out, against expectations based on conventional wisdom, that with a shorter support-structure, thinner sealant layers, and thus a shorter conduit, the same or even better results can be achieved as with a longer support-structure, thicker sealant layers, and thus longer conduits.

It is an object according to a second aspect of the present disclosure to provide a conduit that has a higher sustainability when heat travels via the pipe or cable into the conduit.

According to the second aspect of the present disclosure, a conduit is provided through which at least one pipe or cable extends. The conduit has an inner wall and is provided with a system for sealing in the conduit space that is unoccupied by the at least one pipe or cable. The system comprises at least one rubber element for providing in the conduit a support-structure which is clamped-in in the space that is unoccupied by the at least one pipe or cable; and a sealant layer against the support-structure for sealing off at least one end of the conduit between the inner wall and the at least one pipe or cable. Each rubber element is made of a fire-resistant vulcanized rubber of a thermally substantially non-expandable type. The sealant is made of a fire-resistant polymer which is also of the thermally substantially non-expandable type. The polymer is vulcanizable at room temperature and exposure to humidity, or has vulcanized. At least one of the rubber elements comprises a mantle-wall. At least one of the mantle-walls is provided with a slit which extends over a full length of the rubber element. This rubber element can over the length of the slit embrace, and as such be in close contact with, a pipe or cable in the conduit. It has turned out that such fire-resistant vulcanized rubber elements operate, relatively to air that is trapped in the conduit, as a heat sink. Accordingly, heat is absorbed in the rubber elements which are thermally very stable. This improves the overall thermal insulation of the sealing system in the conduit. For this reason, the conduit can have a reduced length in the axial direction of the conduit. As such, the conduit does not necessarily occupy that much space in a compartment into which the conduit partially extends.

It is according to a third aspect of the present disclosure an object to provide a method for sealing a conduit having an inner wall and having at least one pipe or cable extending through the conduit such that the method can allow for a shorter conduit.

According to the third aspect of the present disclosure, a method according to claim 8 is provided.

It is according to a fourth aspect of the present disclosure an object to provide a method for sealing a conduit having an inner wall and having at least one pipe or cable extending through the conduit, such that the method allows for use of a shorter conduit.

According to the fourth aspect of the present disclosure, a method according to claim 9 is provided.

For the sake of clarity, it is pointed out that rubber or polymer of the thermally substantially non-expandable type comprises rubber respectively polymer which is free from components which would on heating cause the rubber respectively the polymer to expand to an extent larger than the extent to which the rubber respectively the polymer itself expands on such heating.

The present disclosure further describes more detailed examples with reference to the appended and non-limiting drawing, in which:

FIG. 1 schematically, in cross section, an example of a conduit according to the disclosure;

FIG. 2 schematically, in cross section, an example of a conduit according to the disclosure;

FIG. 3 in a perspective and semi-exploded view a step of an example of a method according to the disclosure, during installing the sealing system;

FIG. 4 in a perspective view, an example of a method step according to the disclosure during installing the sealing system;

FIG. 5 in a perspective view, an example of a method step according to the disclosure, in a final stage of installing the sealing system;

FIG. 6 in a perspective and partly exploded view, an example of a conduit according to the disclosure;

FIG. 7 schematically, in cross section, an example of a conduit according to the disclosure; and FIG. 8 schematically, in cross section, an example of a conduit according to the disclosure.

In the drawing, like parts are provided with like references.

DESCRIPTION OF EXEMPLARY EMBODIMENTS

FIG. 1 shows schematically an example of a cross section of a conduit, here referred to as a transit system TS. The transit system TS is usually incorporated in a metal substantially plate-shaped construction element P. This plate-shaped construction element P can be situated between two spaces SI, SII, as separated by the construction element P. The plate-shaped construction element may for instance be a part of a bulkhead, a wall or a deck in or on a ship or another construction that is substantially constructed of a metal such as for instance steel. The transition system TS comprises a conduit wall 1, made of a material which is in this example thermally conductive. The conduit wall 1 may be welded into an opening of the construction element P. Although as shown in this example, the conduit is incorporated in a metal substantially plate-shaped construction element P, it is also possible that the conduit is incorporated in for instance a concrete wall or a separation made of any other material.

Through the conduit extends a pipe 2. As will be discussed later, it is also possible that instead of a pipe 2, one or more cables extend through the opening. The pipe 2 may be made of steel, copper, a copper nickel alloy, or for instance a so-called glass fiber reinforced plastic (GRP) pipe. The system as installed in the conduit in a space that is unoccupied by the pipe 2 (usually an annular space between an inner wall 3 of the conduit 1 and the pipe 2) comprises at least one rubber element 4 for providing in the conduit 1 a support-structure. The one or more rubber elements 4 are clampable between the inner wall 3 and the pipe 2. In practice, the support structure is thus clamped-in the conduit 1. Each of the rubber elements 4 as clamped-in, all are part of the support-structure. The system further comprises a sealant layer 5 for application against the support structure and for sealing off at least one end 6 of the conduit 1 between the inner wall 3 and the pipe 2. As shown, preferably both ends 6 are sealed off by a sealant-layer 5. The sealant layer 5 has a thickness in a range of 14-19 mm, preferably 14-16 mm, and most preferably has a thickness of 15 mm. In this disclosure, the thickness of the layer may also be defined by the distance between the end of the support-structure as clamped-in in the conduit and the closest end of the conduit.

Each rubber element 4 is made of a fire-resistant vulcanized rubber of a thermally substantially non-expandable type. The rubber is preferably a silicon based rubber. This rubber can be made by standard processes known to those skilled in the art on the basis of components which are widely commercially available. The sealant layer 5 is made of a fire-resistant polymer which is vulcanizable at room temperature under exposure to humidity and which is also of the thermally substantially non-expandable type. The polymer is preferably a silicon based polymer. Also such a sealant can be made by a standard process known to those skilled in the art and on the basis of components which are widely commercially available. A rubber of the thermally substantially non-expandable type comprises a rubber which is free from components which would on heating cause the rubber to expand to an extent larger than the extent to which rubber itself expands on such heating. Likewise, a polymer of the thermally substantially non-expandable type comprises a polymer which is free from components which would on heating cause the polymer to expand to an extent larger than the extent to which a polymer itself expands on such heating.

Examples of rubber elements in the form of sleeves which would be suitable for use in the technology of the present disclosure are available from the Applicant under the tradename NOFIRNO. Similarly, the sealant is available under the tradename NOFIRNO Sealant.

Preferably, each rubber element 4 is a longitudinal element having a length 1 in a range of 10 to 16 cm, preferably in a range of 12 to 14 cm. Most preferably length 1 is 13 cm. This allows for easily placing such an element into the conduit and parallel to pipe 2. When the sealing system comprises one rubber element this could be a substantially annular element provided with a longitudinal slit to allow for the placement coaxial with pipe 2. However, it is also possible that the rubber element is an element which can be wound around pipe 2 and forced into the longitudinal direction of pipe 2 and conduit into the space between the inner wall 3 and the pipe 2. Longitudinal rubber elements 4 aligned as shown in FIG. 1 provide a support structure against which sealant layer 5 can be applied. When pressure is applied in longitudinal direction of conduit and pipe 2, the support-structure as provided by the one or more rubber elements 4 offers good support to sealant 5.

Figure 1:
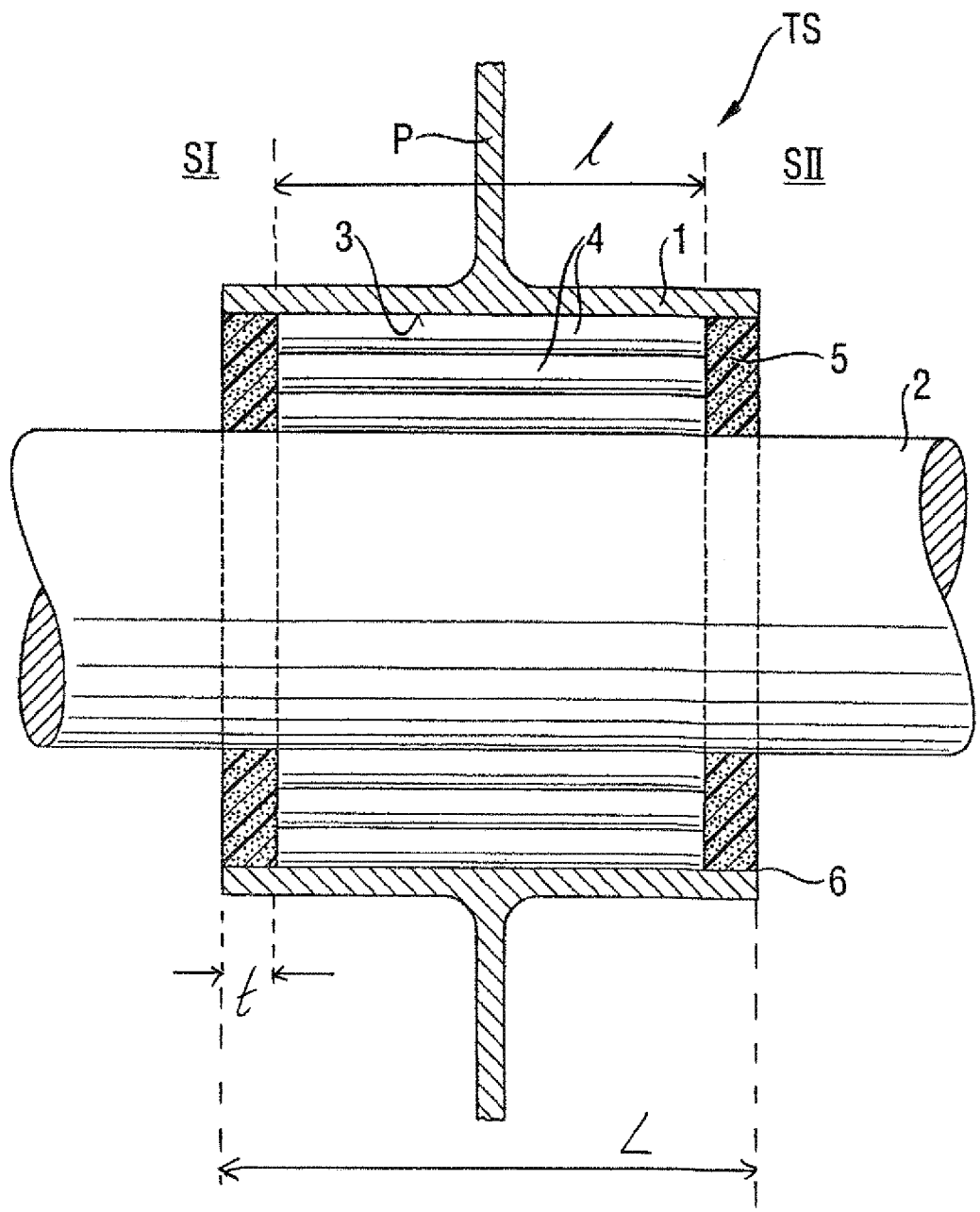

Such a method comprises: placing at least one rubber element in a space in a conduit that is unoccupied by the at least one pipe or cable, so that therewith a clamped-in support-structure is provided. This support-structure is such that on each side thereof space remains available for applying a sealant layer within the conduit and against the support-structure for sealing off a respective end of the conduit. The method further comprises applying a sealant layer against the support-structure for sealing off a respective end of the conduit. The sealing layer has a thickness in the range of 14-19 mm, preferably a range of 14-17, most preferably has a thickness of 15 mm. As indicated earlier on, the thickness of the sealant layer may also be defined by the shortest distance between an end of the support-structure as clamped-in in the conduit and the closest end of the conduit.

In these figures it is shown that the rubber elements 4 may be longitudinal rubber elements having a tubular shape. Each of the rubber elements 4 comprises preferably a mantle wall. When the mantle wall is closed in itself, i.e. non-split, the strength of the tubular rubber element is stronger compared to a situation wherein the mantle wall is provided with a longitudinal slit. The thickness of the mantle wall is preferably in a range of 2-5 mm, even better is 3-4 mm. Although it is possible to provide the tubular elements 4 for instance such that the cross section is a squared, triangular or differently angularly shaped, it is also possible to have a cross section which is more rounded, such as an elliptical or a circular cross section. Preferably, each of the rubber elements is cylindrical in shape. This shape helps the tubular element 4 to be equally strong in each transverse direction. Once the conduit 1 is filled with such longitudinal cylindrically shaped tubular rubber elements, the support structure as formed with those elements 4, can be clamped by itself in the space between the inner wall 3 of the conduit 1 and the pipe 2. This enhances the strength and stiffness of the support structure. As such, the support structure can also support the pipe 2 as extending through conduit 1. Due to the very nature of the material used for building this support structure, a mechanical shock can easily be absorbed by this support structure. Vibrations, particularly in transverse direction are most likely to be fully dampened out by the support structure. At the same time, the strength offered by the support structure in a longitudinal direction is extremely high. Also sound can be dampened out, and thus absorbed by the sealing system according to the invention.

The strength further increases with the tightness by which the rubber elements 4 are clamped within the space between inner wall 3 and pipe 2. Relative movement of the rubber elements 4 in their axial directions is inhibited by relatively high frictional forces occurring at their contact surfaces. The rubber elements also have a low compression set, a property related to the maximum deformation which the rubber can experience and from which it can still fully relax back to its original dimensions. The compression set is relatively low, about 40%, so that the clamping offered can be maintained during service life of the sealing system.

Beside the good mechanical properties of the support structure it must also be appreciated that such a structure comprises a number of channels which are fully isolated from each other, and particularly when the sealant layer 5 is applied at both ends 6 of the conduit 1, closed off at both ends, such that the support structure also becomes a very good thermal insulator. The air cavities formed by the unconnected channels also add to the high thermal insulation of the support structure itself.

It has turned out that an optimal support structure can be formed when a number of the cylindrically shaped rubber elements have an outer diameter in a range of 16-40 mm. Depending on this outer diameter, the inner diameter is preferably in a range of 10-32 mm. The fire-retardant vulcanized silicon rubber has preferably a hardness in the range of 70-78 Shore A. A very suitable hardness is 74 Shore A. For easy production, ordering, stocking and installing of these rubber elements, the elements have preferably all the same shape. However, it is possible that the elements comprise two types of rubber element. All elements may have similar dimensions in the longitudinal direction, but a member of one of the two types and a member of the other one of the two types may differ in transverse dimension. This allows for filling the conduit with the rubber elements 4 in an optimal way, not only with regard to easy installing but also with regard to obtaining a support structure with optimal properties.

Figure 2:
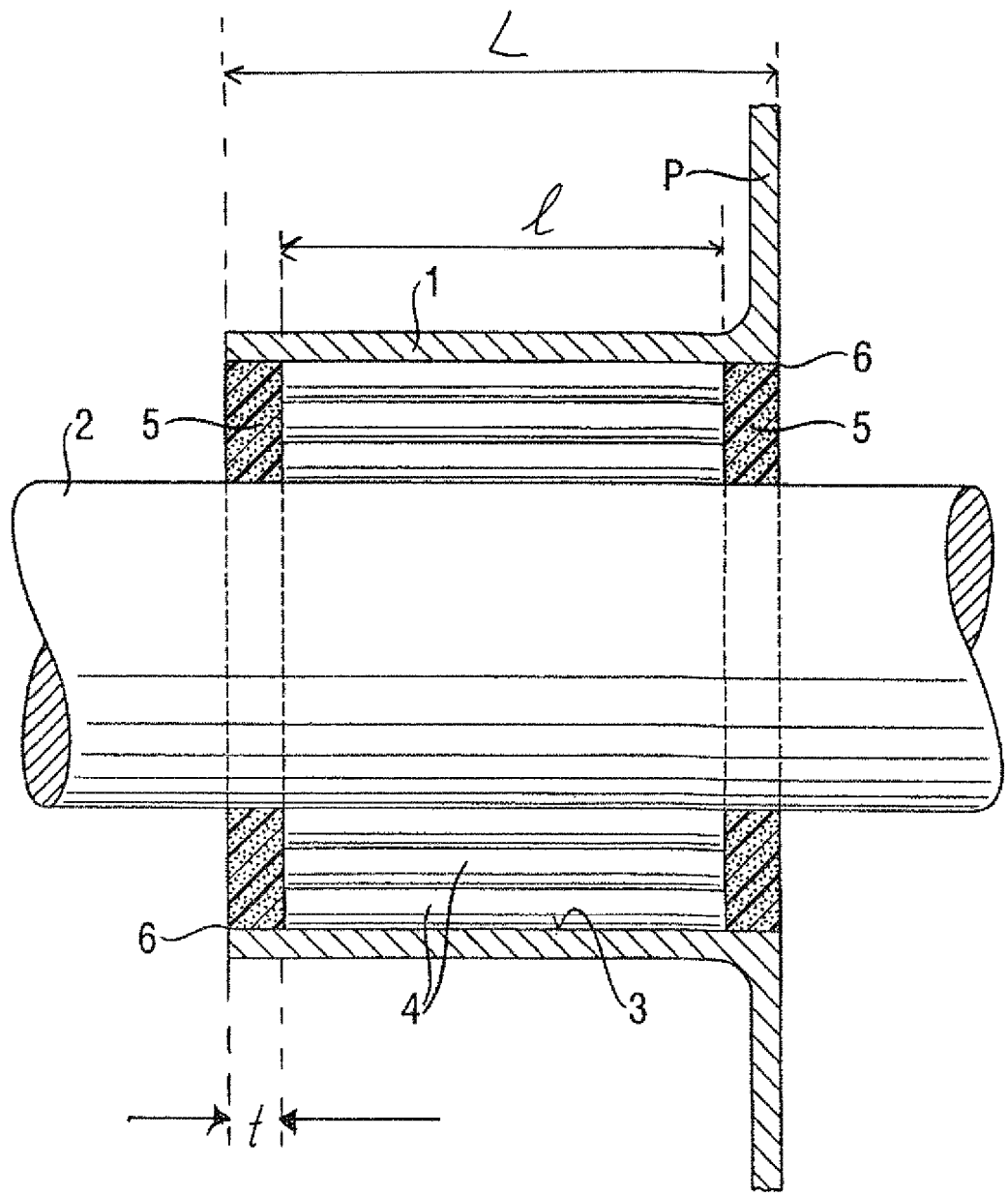
FIG. 2 shows that a conduit according to the disclosure can also be asymmetrically positioned with respect to construction element P.
Figure 3:
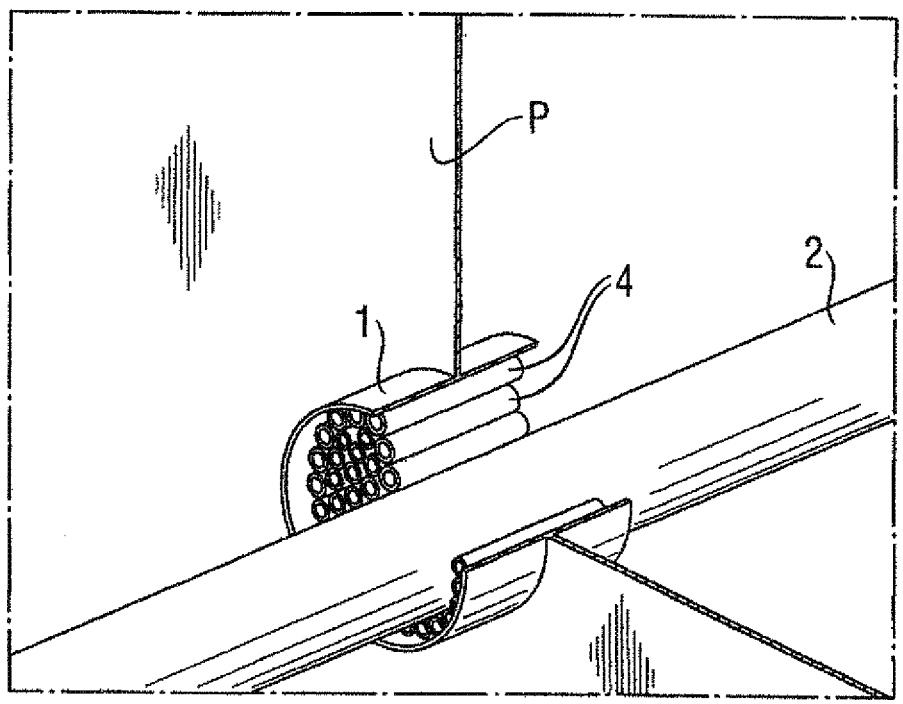
FIG. 3-5 show how a sealing system according to the disclosure can be installed in a conduit through which a pipe 2 extends as an example of a method for sealing a conduit having an inner wall and having at least one pipe or cable extending through the conduit.

It is pointed out that a support structure having the structural properties as follows from the use of tubular rubber elements, may also be achieved by using longitudinal elements having a shape as shown in for instance FIG. 2 of WO 03/067136.

Figure 4:
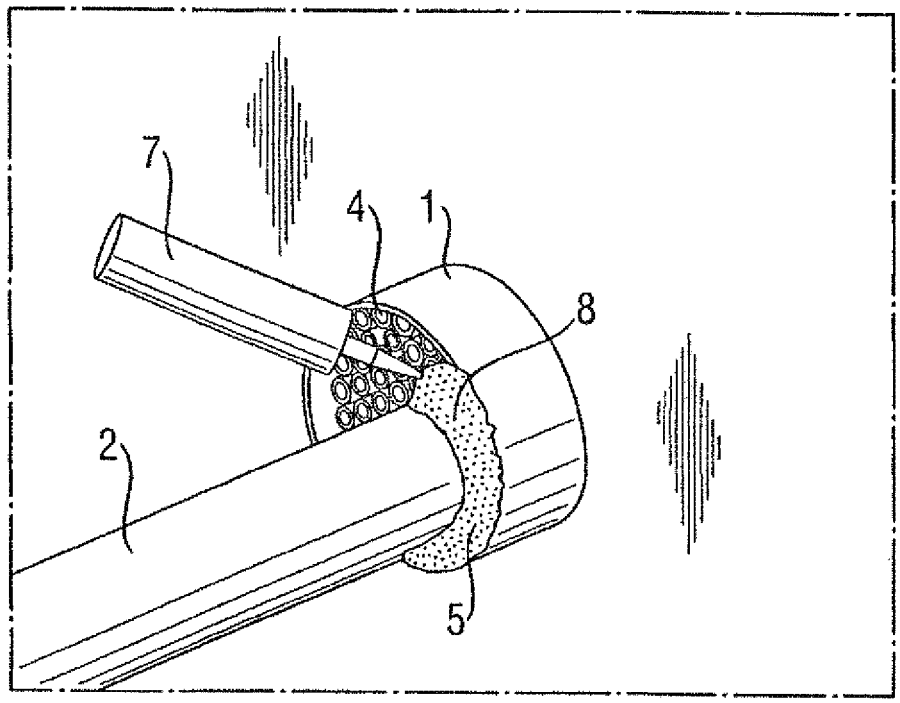

As shown in FIG. 4, once the space between the inner wall 3 and the pipe 2 is completely filled with rubber elements 4, the sealant layer 5 made of fire-resistant polymer, preferably a silicon based polymer, and vulcanizable at room temperature under exposure to humidity, is applied at the end 6 of conduit between the inner 3 and pipe 2 and against the support structure as formed by rubber elements 4.

The sealant layer can be made such that an outer layer 8 of the sealant is cured under exposure to atmospheric humidity within a period of time of about 1 to 2 hours, and often even faster. When applied for sealing off an end 6 of the conduit 1 and as vulcanized under exposure to atmospheric humidity within 1 to 2 hours (or even faster), the sealant has a hardness of about 40-45 Shore A.

Figure 5:
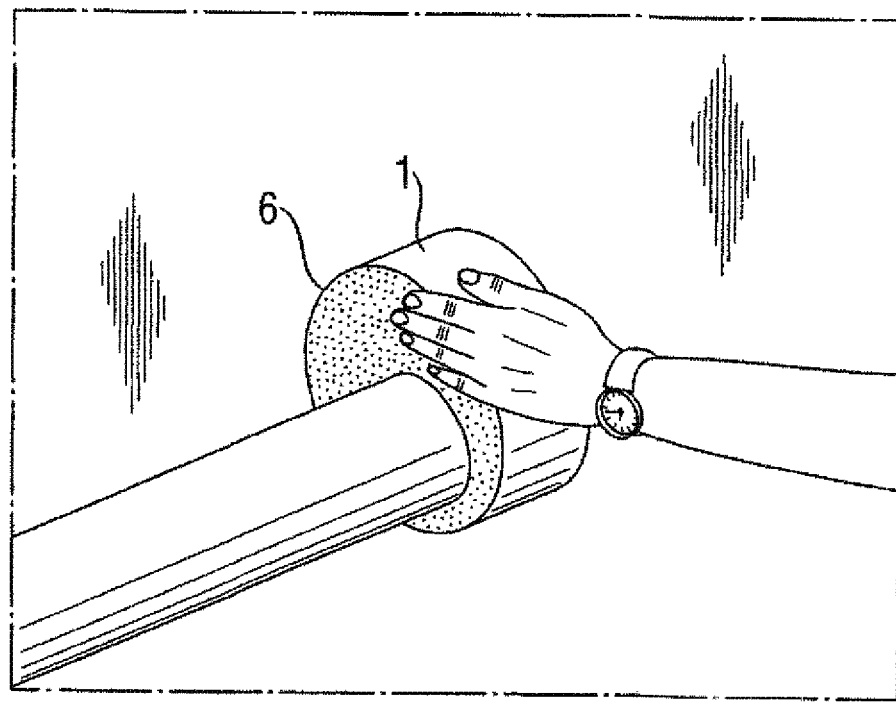
Figure 6:
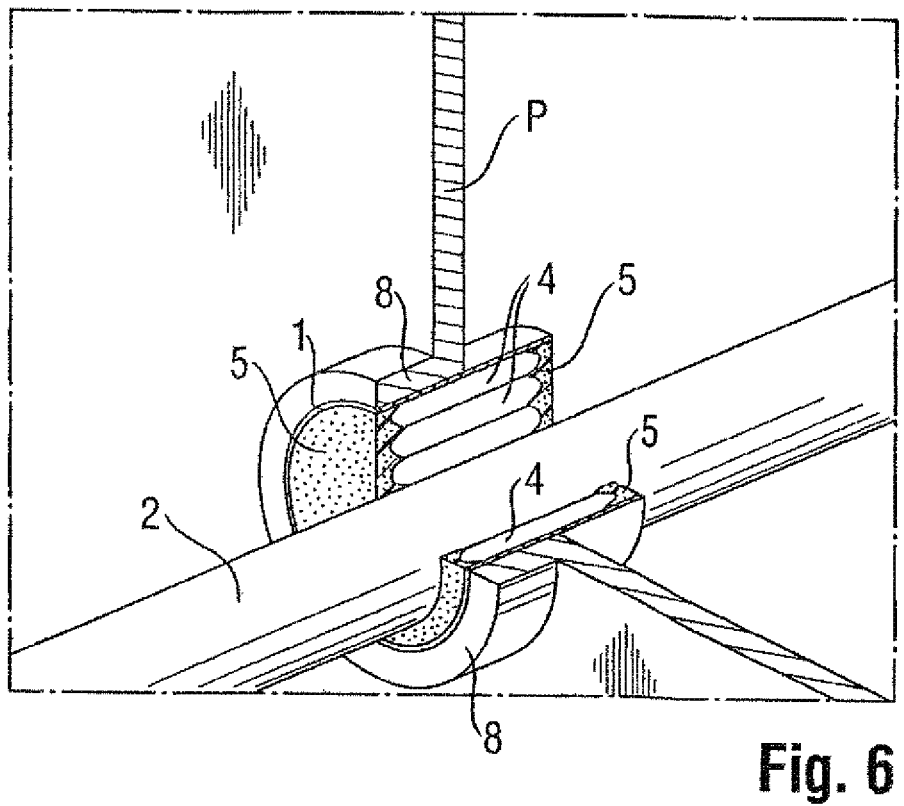

As shown in FIG. 5, before the sealant layer 5 has fully been cured, i.e. vulcanized, it is possible to press manually the sealant further into conduit, so that sealing material will end up within the tubular elements 4 as well as between the tubular elements 4. Of course sealant may already have ended up in cavities of the support structure when applied against the structure, in particular when use was made of a so-called high pressure applicator to applying the sealant. This is to a certain extent shown in FIG. 6. This pressing of the sealant into the conduit 1 may continue until the sealant is flush with an outer end of conduit. After curing of the sealant layer 5, support structure and sealant layer 5 can mechanically be a single structure. Adhesion of the sealant layer 5, both to the rubber elements 4 forming the support structure and to the inner wall 3 of the conduit 1, is very good.

The performance of the sealing system when on one side of the conduit a nearby fire is exposing that side of the conduit to an enormous amount of heat, is also very good. For a start, within the first hour after exposure to the nearby fire, no smoke passes the sealing from a side where the fire takes place. The same applies for smells. In fact, within the first hour after exposure of one side of the conduit to a nearby fire, it is only the red-hot colour of the metal conduit and the steel construction element P which reveals that a fire is taking place at the other side of the conduit.

At the side unexposed to the fire, after one hour the sealing system has in the middle between the inner wall 3 of the conduit 1 and the pipe 2 (both of steel) only risen by about 160° C. As the silicon rubber and the sealant is non-ignitable at a temperature of 400° C. or lower, this part of the sealing system remains fully intact. The mechanical stability of the sealing is also largely unaffected by the fire as taking place at the other end of the conduit. Each rubber element 4 and the sealant layer has preferable an oxygen index of 45% or higher. It turns out that during such conditions as described, such an embodiment of a sealing system in accordance with the invention, is not consumed during exposure to a nearby fire at either side of the conduit. It has turned out that without any insulation applied to the conduit and/or the construction element P (so that heat can enter the conduit via the construction element P and pipe 2), the sealing system can easily sustain more than one hour exposure to the fire at one end of the conduit without having any smoke or smells passing through the conduit and without having any flame breaking through the conduit to the unexposed side. The time during which such an excellent insulation as provided by the sealing system can be maintained, can be lengthened when insulation material is applied against the conduit and/or the construction element P. Such material is shown by reference 8 in FIG. 6 and is usually a form of mineral wool. However, this system has primarily been invented for use in non-insulated construction elements P. If it is certain that insulation will be applied, then the conduit can be shorter in longitudinal direction.

The sealing system is preferably such that rubber elements 4 and/or the sealant 5 have a colour which contrasts with black. This allows after exposure of one side of the conduit 1 to a nearby fire, quickly identification of the sealing system. This allows for assessing the severity of the fire, and for assessing the time during which the sealing system was exposed to enormously high temperatures. In other words, it allows for understanding what took place during the fire in terms of thermal exposure. The colour contrasting with black is preferably red-brown, something like terracotta. This colour is very easily traced back even in a fully blackened and burned out compartment.

Figure 7:
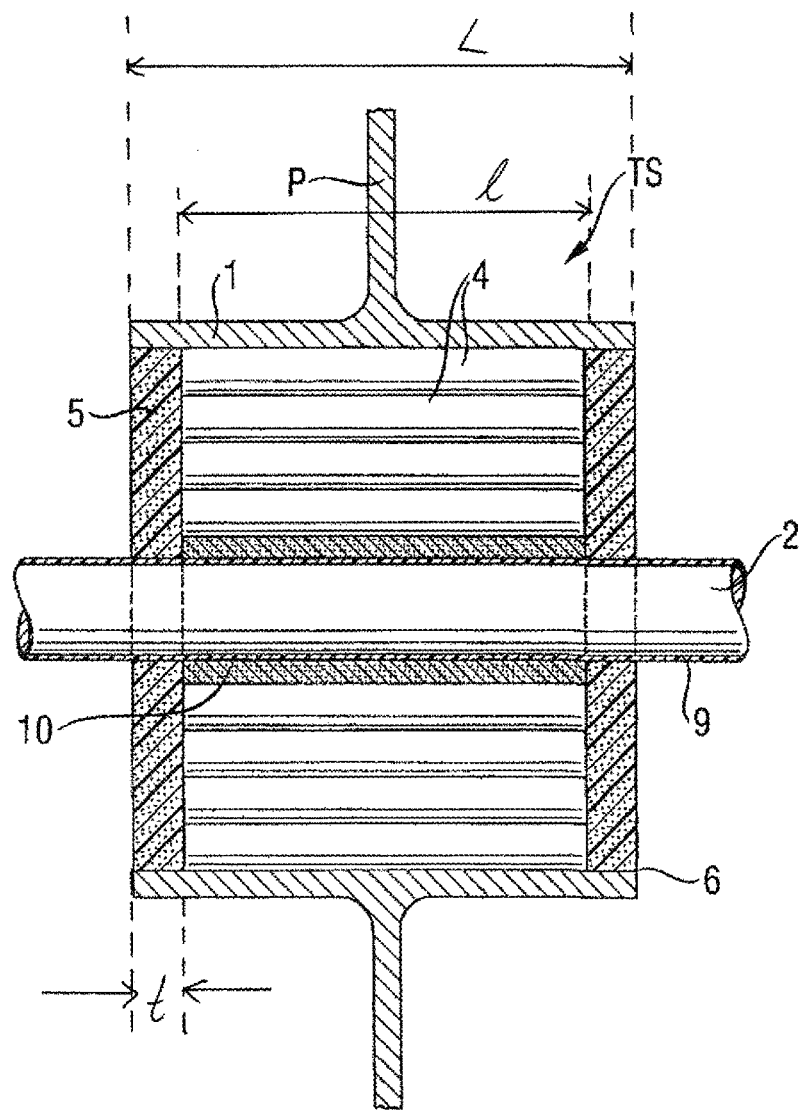

FIG. 7 shows another example of a conduit in accordance with the disclosure.

The transit system TS is shown as an example of a conduit through which a cable 2 extends. The conduit has a conduit wall 1 and an inner wall. The conduit is provided with a system for sealing in the conduit space that is unoccupied by the cable 2. The system comprises at least one rubber element 4 for providing in the conduit a support-structure which is clamped-in in the space that is unoccupied by the cable 2. The system further comprises a sealant layer 5 against the support-structure for sealing off at least one end 6 of the conduit between the inner wall and the cable 2. Each rubber element 4 is made of a fire-resistant vulcanized rubber of a thermally substantially non-expandable type. The sealant is made of a fire-resistant polymer which is vulcanizable at room temperature and exposure to humidity or which has vulcanized. The polymer is also of the thermally substantially non-expandable type. Rubber element 10 comprises a mantle wall. The mantle wall is provided with a slit (not shown) which extends over the full length of the rubber element 10. The rubber element 10 is preferably a longitudinal element and preferably tubular. Element 10 can be placed around cable 2, ideally such that contact is obtained between rubber element 10 and sheeting 9 of cable 2.

Figure 8:
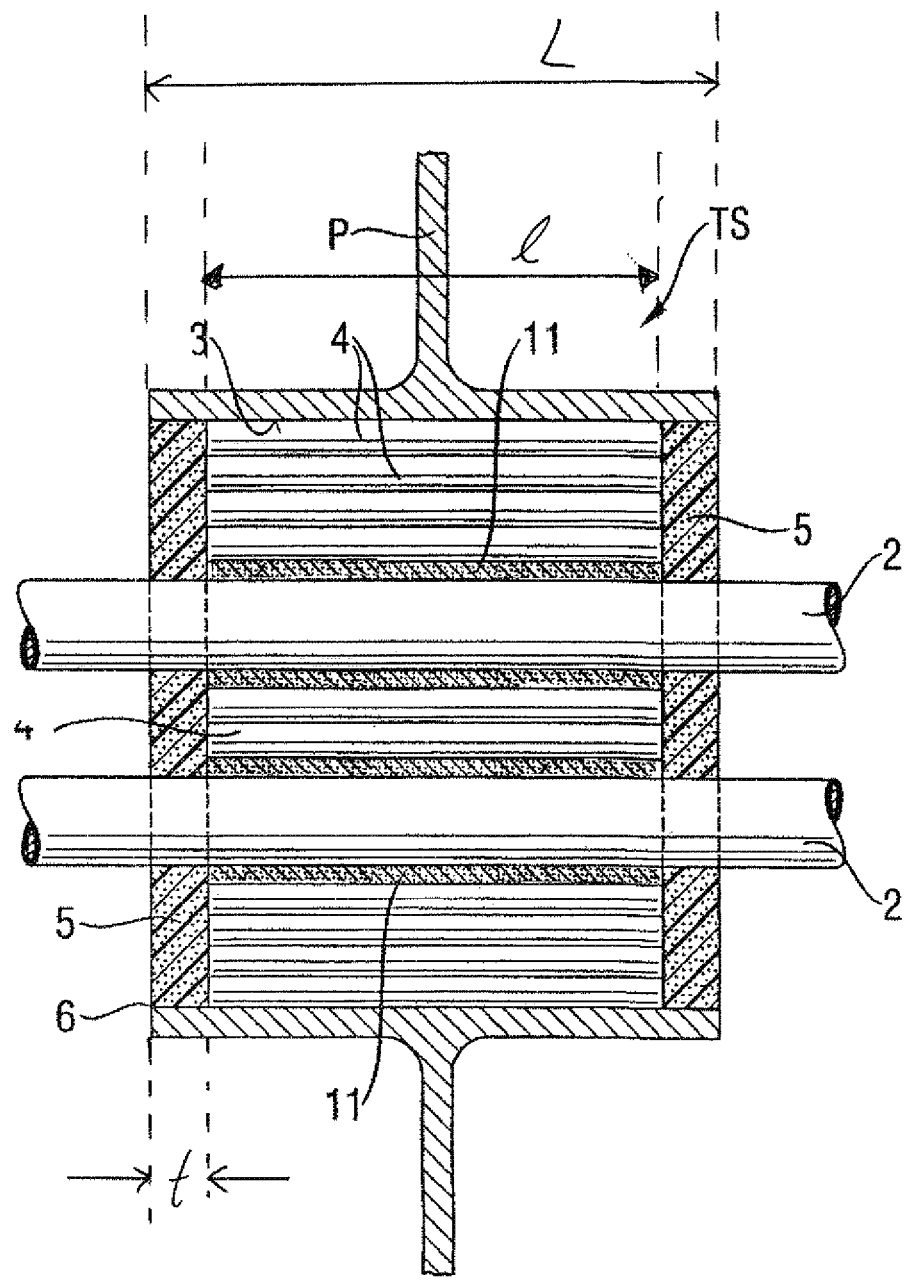

FIG. 8 shows a transit system TS or a conduit with a sealing system according to the disclosure. The sealing system is suitable for "multiple penetrations", i.e. for a conduit through which more than one pipe (or cable) extends. It is of course possible that many more cables 2 extend through the conduit. The elements 11 may be of a single sleeve type having a slit that extends over a length of the sleeve so as to enable placement of the sleeve around the cable 2. Rubber elements 4 may be provided in units of bonded rubber elements 4. Single rubber elements may easily be torn off from the unit of bonded elements. Such rubber elements may still have the shape of a sleeve, i.e. be longitudinal and tubular. Examples of fire-resistant sleeve members which are bonded together into one unit of sleeve members are disclosed in EP 2116280 A1.

Conduits such as shown in FIGS. 7 and 8 are provided using the following method. A rubber element being provided with a mantle wall having a slit over a full length of the rubber element is placed around one or more of the cables which extend through the conduit. Further, a number of rubber elements are placed in space in the conduit that is unoccupied by the one or more pipes or the one or more cables. On putting more and more rubber elements in the space that is unoccupied by pipes or cables, eventually a clamped-in support-structure is provided. The positioning of the support-structure in the conduit is preferably such that on each side thereof space remains available for applying a sealing layer within the conduit and against the support-structure for sealing off a respective end of the conduit. Once a very stable support-structure is obtained, a sealant layer is applied against the support-structure for sealing off a respective end of the conduit.

Examples of conduits according to the present disclosure have in axial direction a length in the range of 15-17 cm. Preferably these conduits have a length of 16 cm.

It is further pointed out that examples of a conduit according to the present disclosure are not only suitable for a plurality of cables or a plurality of pipes, but also for a mixture of pipes and cables and for pipes and/or cables of different materials, such as plastic and metal.

The disclosure is not limited to any of the examples described above on the basis of the figures and the drawings. Many modifications are possible.

In particular rubber elements 4 may have a different shape than shown and discussed. It is possible to provide blocks of a predetermined structure such as would be obtained by clamping a number of tubular elements together, and to cut out of such blocks suitably sized segments for insertions in the conduit. Such variations are all understood to fall within the framework of the invention as defined by the appended claims.

The conduit may be of a metal or a metal alloy. Heat will then also be transferred via the conduit material into the conduit. Alternatively, the conduit may comprise a through hole in a concrete wall or ceiling. Less heat will then be transferred into the conduit. The conduit may also be formed in or of a heat insulating material, blocking heat. The conduit may have an inner wall that comprises hydrous phyllosilicate mineral material, preferably coated with a fire retardant coating. It is also possible, alternatively or additionally that the conduit has an inner wall comprising a glass-filled hard engineering plastic. These are prefab conduits often having a large flange and are light and easy to apply, for instance by glueing, using fire resistant sealant, between the flange and a wall.

The invention claimed is:

1. A conduit through which at least one pipe or cable extends, wherein the conduit has an inner wall and is provided with a system for sealing in a space in the conduit that is unoccupied by the at least one pipe or cable, wherein the system comprises:
rubber elements for providing in the conduit a support-structure which is clamped-in in the space in the conduit that is unoccupied by the at least one pipe or cable; and a sealant layer against the support-structure for sealing off at least one end of the conduit between the inner wall and the at least one pipe or cable, wherein each rubber element is made of a rubber that is fire-resistant vulcanized and thermally substantially non-expandable, wherein the sealant layer is made of a polymer that is fire-resistant and thermally substantially non-expandable, wherein the polymer is vulcanizable at room temperature under exposure to humidity or has vulcanized, wherein the sealant layer has a thickness in a range of 14 to 16 mm wherein each rubber element is a longitudinal element, and wherein each longitudinal element has a length in a range of 12 to 14 cm, wherein at least one of the rubber elements comprises a mantle-wall that is closed in itself.

2. The conduit according to claim 1, wherein the fire-resistant vulcanized and thermally substantially non-expandable rubber is free from components which would on heating cause the rubber to expand to an extent larger than the extent to which the rubber itself expands on such heating, and wherein the thermally substantially non-expandable polymer is free from components which would on heating cause the polymer to expand to an extent larger than the extent to which the polymer itself expands on such heating.

3. The conduit according to claim 1, wherein the rubber comprises a silicone based rubber.

4. The conduit according to claim 1, wherein the polymer comprises a silicone based polymer.

5. The conduit according to claim 1, wherein each rubber element is a tubular element, or wherein a number of the rubber elements can together form one tubular element.

6. The conduit according to claim 1, wherein the rubber has a hardness in a range of 70 to 78 Shore A.

7. The conduit according to claim 1, wherein at least one of the rubber elements is cylindrical in shape.

8. The conduit according to claim 7, wherein the at least one of the rubber elements that is cylindrical in shape has an outer diameter in a range of 16 mm to 40 mm.

9. The conduit according to claim 7, wherein the at least one of the rubber elements that is cylindrical in shape is a tubular element having an inner diameter in a range of 10 mm to 32 mm.

10. The conduit according to claim 1, wherein the sealant layer has after vulcanization a hardness in a range of 35-50 Shore A.

11. The conduit according to claim 1, wherein each rubber element and/or the sealant layer is non-ignitable at a temperature of 400° C.

12. The conduit according to claim 1, wherein each rubber element and/or the sealant layer has an oxygen index of 45% or higher.

13. The conduit according to claim 1, wherein each rubber element and/or the sealant layer has a colour which contrasts with black.

14. The conduit according to claim 13, wherein the colour is red brown or white.

15. The conduit according to claim 1, wherein the conduit has in an axial direction a length in a range of 15-17 cm.

16. The conduit according to claim 1, wherein the conduit is of a metal or a metal alloy.

17. The conduit according to claim 1, wherein the conduit comprises a through hole in a concrete wall or ceiling.

18. The conduit according to claim 1, wherein the conduit has an inner wall that comprises hydrous phyllosilicate mineral material.

19. The conduit according to claim 1, wherein the conduit has an inner wall comprising a glass-filled hard engineering plastic.

20. The conduit according to claim 1, wherein the mantle-wall is provided with a slit which extends over a full length of the at least one of the rubber elements.

21. The conduit according to claim 1, wherein the thickness is 15 mm.

22. The conduit according to claim 6, wherein the hardness of the rubber is about 74 Shore A.

23. The conduit according to claim 10, wherein the hardness of the sealant layer after vulcanization is in a range of 40-45 Shore A.

24. The conduit according to claim 18, wherein the hydrous phyllosilicate mineral material is coated with a fire retardant coating.

* * * * *